United States Patent [19]

Kotoh

[11] 4,367,480

[45] Jan. 4, 1983

[54] HEAD DEVICE FOR INK JET PRINTER

[75] Inventor: Haruhiko Kotoh, Shiojiri, Japan

[73] Assignees: Kabushiki Kaisha Suwa Seikosha, Tokyo; Shinshu Seiki Kabushiki Kaisha, Nagano, both of Japan

[21] Appl. No.: 223,592

[22] Filed: Jan. 9, 1981

Related U.S. Application Data

[63] Continuation-in-part of Ser. No. 106,316, Dec. 21, 1979, abandoned.

[30] Foreign Application Priority Data

Dec. 23, 1978 [JP] Japan ................................ 53/163629

[51] Int. Cl.³ .............................................. G01D 15/18

[52] U.S. Cl. .................................................. 346/140 R

[58] Field of Search ......................................... 346/140

[56] References Cited

U.S. PATENT DOCUMENTS

| | | | |
|---|---|---|---|
| 3,747,120 | 7/1973 | Stemme | 346/140 X |
| 3,832,579 | 8/1974 | Arndt | 346/140 X |
| 3,869,986 | 3/1975 | Hubbard | 346/140 X |
| 3,988,745 | 10/1976 | Sultan | 346/140 |
| 4,015,271 | 3/1977 | Sultan | 346/140 R |
| 4,189,734 | 2/1980 | Kyser | 346/140 X |
| 4,216,477 | 8/1980 | Matsuda | 346/140 |

FOREIGN PATENT DOCUMENTS 2516797 10/1976 Fed. Rep. of Germany ...... 346/140

OTHER PUBLICATIONS

Anschel et al., Modular D–O–D Ink Jet Printing Head, IBM TDB, vol. 20, No. 12, May 1978, pp. 5425–5428.

*Primary Examiner*—Joseph W. Hartary

*Attorney, Agent, or Firm*—Blum, Kaplan, Friedman, Silberman and Beran

[57] ABSTRACT

A head for an ink-on-demand type ink jet printer includes two laterally offset, linear rows of ink nozzles, said nozzle rows being linearly offset for producing alternate dots of a continuous printed line of dots. Interconnected chambers and channels, formed in opposite surfaces of a central plate, are closed by coverplates to provide pressure chambers and nozzle ducts. Individual piezoelectric elements externally affixed to the coverplates in registry with the pressure chambers, when driven, locally deform the coverplate to drive ink from the associated nozzles. Ducts and chambers in one surface are not in registry with the ducts and chambers of the opposite surface, and the lateral offset between rows is less than the printed-character spacing.

4 Claims, 18 Drawing Figures

FIG. 3
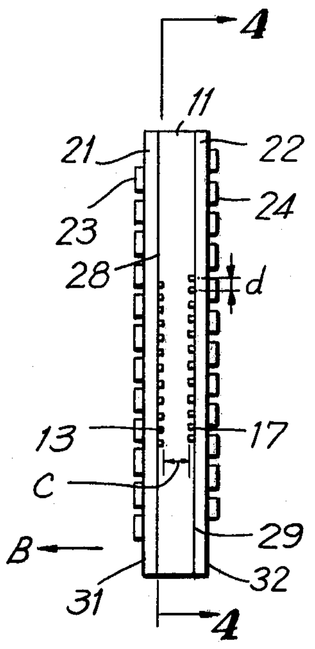
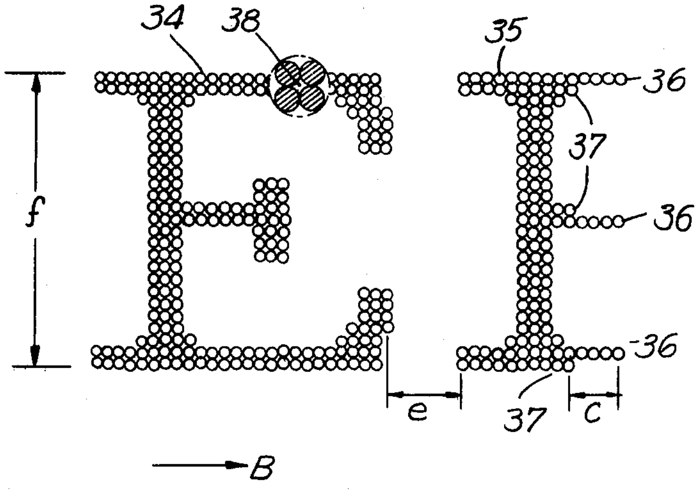
FIG. 7

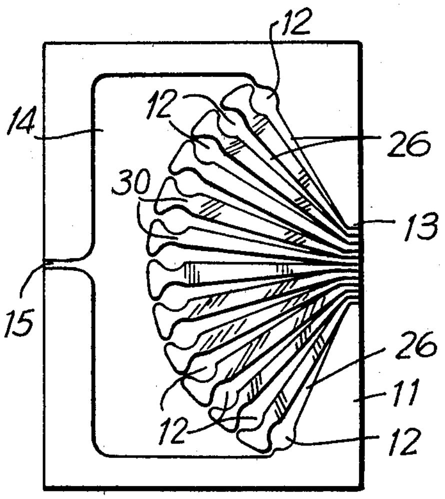
FIG. 4
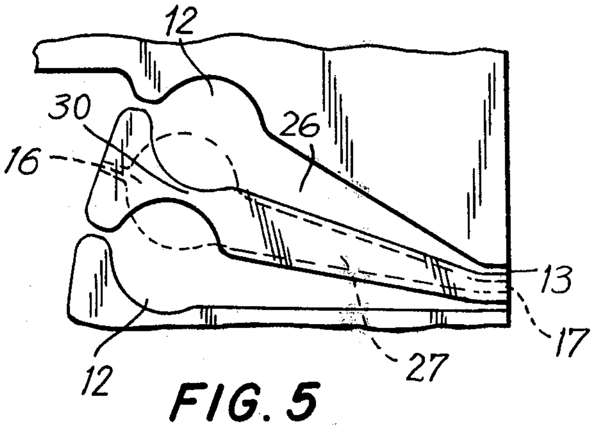
FIG. 5
FIG. 6
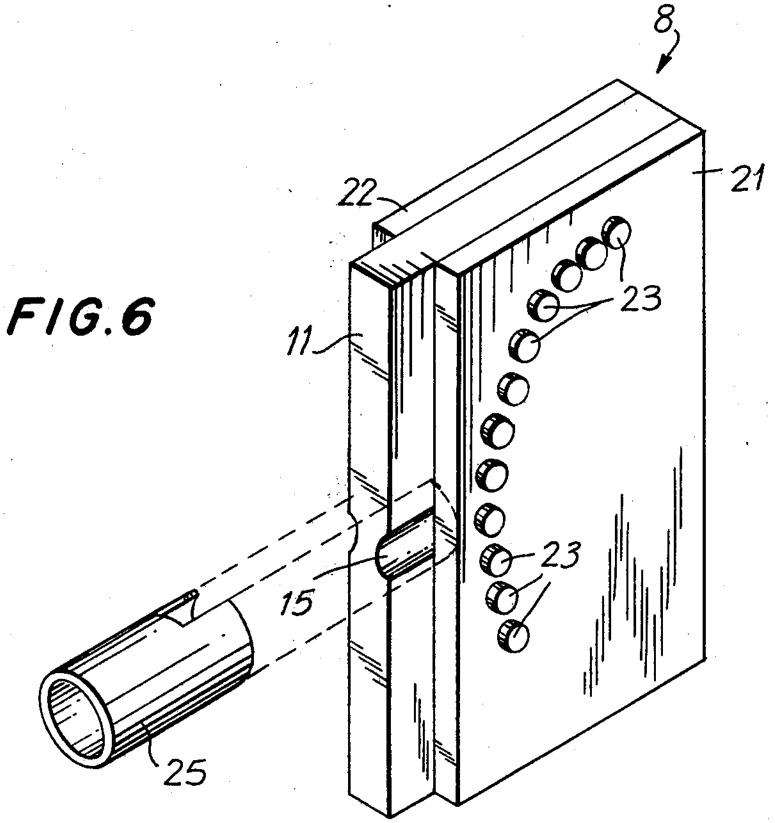

FIG. 8
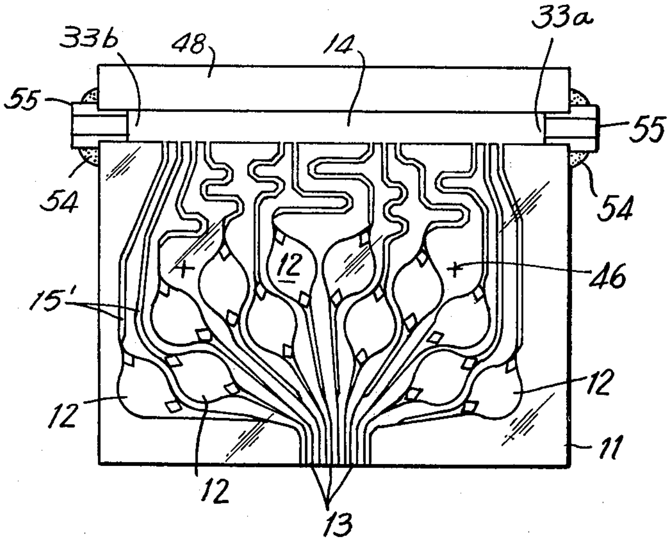
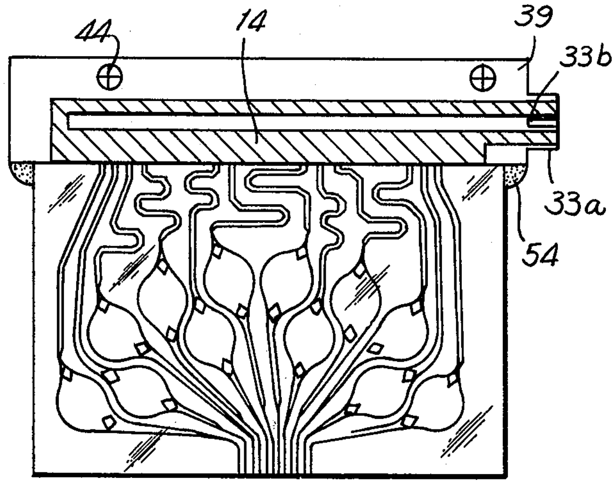
FIG. 10

FIG. 11
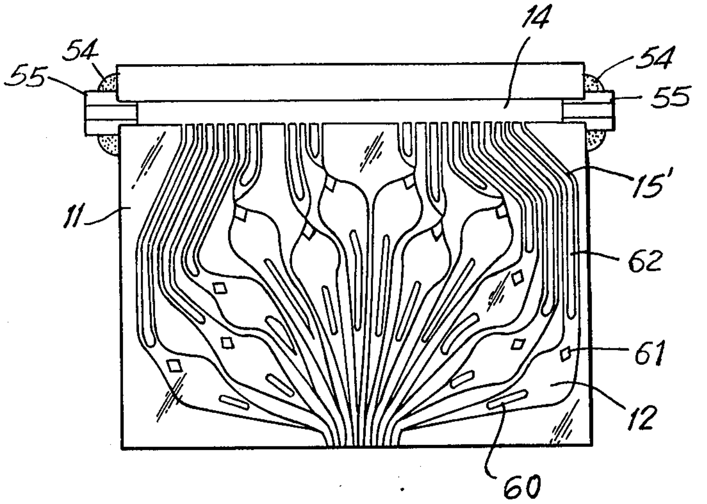
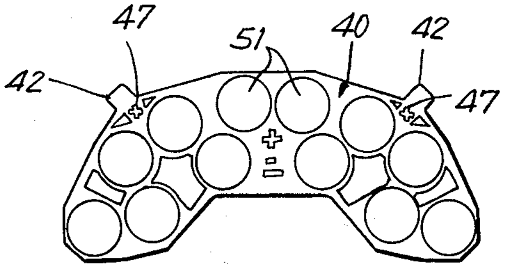
FIG. 12

HEAD DEVICE FOR INK JET PRINTER

This application is a continuation-in-part of application Ser. No. 06/106,316, filed Dec. 21, 1979, for Head Device for Ink Jet Printer, now abandoned.

BACKGROUND OF THE INVENTION

This invention relates generally to a head for an ink-on-demand type ink jet printer and more particularly to a head which provides high-density print from a head requiring simple control circuitry. It is an object of many printer designs to produce printed matter having the high quality which is normally produced when using conventional printer's type and relying on contact pressure as is done in a printing press or typewriter. In comparison, the print quality of wire type and ink jet type dot printers has been inferior due to a lack of density in the finished characters resulting from spaces between the dots. Efforts to reduce the space between dots when using a single row of ink jet nozzles or when using a plurality of interrelated heads for producing a single character have been only partially successful and result in significantly more complex control systems.

What is needed is a head for an ink-on-demand type ink jet printer which produces characters of high density and operates with a simple control system.

SUMMARY OF THE INVENTION

Generally speaking, in accordance with the invention, a head for an ink-on-demand type ink jet printer which produces a high-density printed character and operates with a simple control system is provided. The head for the ink jet printer includes two laterally offset, linear rows of ink nozzles, said nozzle rows being linearly offset for producing alternate dots of a continuous printed line of dots. Interconnected chambers and channels, formed in opposite surfaces of a central plate, are closed by coverplates to provide pressure chambers and nozzle ducts. Individual piezoelectric elements externally affixed to the coverplates in registry with the pressure chambers, when driven, locally deform the coverplate to drive ink from the associated nozzle. Ducts and chambers on said opposite plate surfaces are positioned in a fan-shaped array, which provides uniform-length ducts for delivery of ink to the outlet of each nozzle, and the ducts and chambers in one surface are not in registry with the ducts and chambers of the opposite surface. The lateral offset between rows is less than the printed-character spacing, such that the head is never simultaneously engaged in the printing of more than one character. Distribution of the nozzles on both sides of the central plate allows for a reduced size, and printing a single character at a time reduces control complexity.

Accordingly, it is an object of this invention to provide an improved head for an ink-on-demand type ink jet printer which prints closely spaced dots for high-density printing of characters.

Another object of this invention is to provide an improved head for an ink-on-demand type ink jet printer which has a plurality of jet nozzle rows, the lateral displacement between the rows being less than the lateral displacement between printed characters.

A further object of this invention is to provide an improved head for an ink-on-demand type ink jet printer wherein all nozzle flow paths are formed in a single plate.

Still another object of this invention is to provide an improved head for an ink-on-demand type ink jet printer which has two rows of jet nozzles, each row producing spaced-apart dots, the jet nozzles being offset such that a printed line comprises alternate dots from each row of nozzles.

Yet another object of this invention is to provide an improved head for an ink-on-demand type ink jet printer which provides high-density printed characters and produces one character at a time.

A still further object of this invention is to provide an improved head for an ink-on-demand type ink jet printer which operates with a simple control system.

Another object of this invention is to provide an improved head for an ink-on-demand type ink jet printer which has pressure chambers on two sides of a common plate and the pressures on one side are not transmitted to the chambers on the other side.

A further object of this invention is to provide an improved head for an ink-on-demand type ink jet printer wherein pressure chambers are staggered in their distance to the associated nozzle and the flow passages are adapted to provide uniform flow impedance to every pressure chamber.

Still another object of this invention is to provide an improved head for an ink-on-demand type printer which has generally circular pressure chambers with an island at the inlet and outlet for uniform flow and pressure distribution.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a front view of a head for an ink jet printer in accordance with this invention;

FIG. 4 is a view taken along line 4—4 of FIG. 3;

FIG. 5 is an enlarged portion of the view of FIG. 4;

FIG. 6 is a rear perspective view, partially exploded and to an enlarged scale, of the head of FIG. 3;

FIG. 7 illustrates, to an enlarged scale, complete and partially complete characters printed by the head of FIG. 3;

FIG. 8 is a view similar to FIG. 4 of an alternative ink jet printer head in accordance with this invention;

FIGS. 10 and 11 are similar to FIG. 8 and show alternative embodiments of an ink jet printer head in accordance with this invention;

FIG. 12 is a plan view of a template used in determining transducer positions during production of an ink jet printer head in accordance with this invention;

DESCRIPTION OF THE PREFERRED EMBODIMENTS

The print head according to this invention relates to an ink jet printer of the ink-on-demand type. The head ejects ink from nozzles by changing the internal volume of a pressure chamber containing ink. In order to obtain a print quality, that is, having a high density, at almost the same level as in conventional print produced by using type characters, it is necessary to have a linear arrangement comprising ten nozzles per millimeter. Such a closely integrated printing head is difficult to produce even with the aid of precision techniques such as chemical etching. Also, there is the disadvantage that the cross-sectional area of the print head becomes increasingly large in order to accommodate all of the pressure chambers associated with large numbers of printing jet nozzles. Nevertheless, a design of an ink jet printer provided with nine dots in a linear arrangement has already been put into practical use with a capability of producing more than one character at a time.

Figure 1:
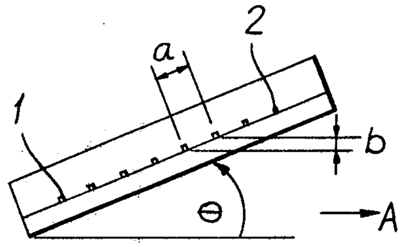
FIG. 1 PRIOR ART
FIG. 1 is a front view of a head for an ink jet printer of the prior art.

Generally speaking, it is not physically possible to produce a head having outlet nozzles sufficiently close together to produce a continuous string of dots on the medium to be printed. In order to reduce or eliminate this deficiency in print density, the row of nozzles in a print head has been inclined relative to the direction of motion of the head or the printing medium moving past the head. This is illustrated in FIG. 1, wherein a print head having eight linearly disposed jet nozzles is inclined at an angle $\theta$ relative to the direction of motion indicated by the arrow A. As a result, although the nozzles are displaced, one from the other, along a line by a linear distance a, the dots produced by the nozzles appear on the printed medium as spaced apart only by a distance b. Accordingly, the distance b between the centerlines of printed dots is, generally speaking, the sine of the angle $\theta$. However, when applying this kind of tilted printing apparatus to a typewriter, it is quite likely that while the nozzle 1 at one end of the row of nozzles prints dots composing one character, concurrently, the nozzle 2 at the other end of the same row of nozzles is printing the dots forming another character. When different characters are printed at the same time, it is necessary to increase the number of character generators, or memories, and as a result, the control circuitry becomes complicated. Also, when printing characters one by one by applying an input to a key, it is required that the head for the printer should be returned along the printed line by the space which has been entered by the leading edge of the tilted head although no printing has been accomplished in that space. Return of the head along the line after it has finished printing a character prepares the head for printing of the next character. Thus, there are several disadvantages, such as the complexity of the required control circuitry, an increase in energy required for moving the head through additional motions, and vibration induced by return of the head. Furthermore, the problem of the increased cross-sectional area of the head to accommodate pressure chambers for all of the nozzles, as the number of nozzles increases, is not resolved by tilting of the head.

Figure 2:
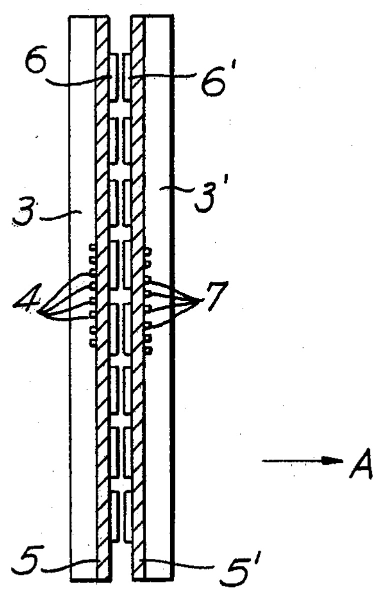
FIG. 2 PRIOR ART
FIG. 2 is a front view of another prior art head for an ink jet printer.

Another embodiment of a print head for ink jet printing of the prior art which produces a high-density printed character is shown in FIG. 2. Nozzles 4 and individual pressure chambers (not shown) connected to each nozzle 4 are formed in a plate 3. A vibration plate 5 is joined to the plate 3, and piezoelectric elements 6 are attached to the vibration plate 5 at positions in registry with the pressure chambers formed in the plate 3. A second similar head comprising a plate 3′, a vibration plate 5′, piezoelectric elements 6′ and nozzles 7 in a linear row cooperates with the first head to provide printed characters of high density. To accomplish this, the two heads are positioned so that the nozzles 4 on one head and the nozzles 7 on the other head are shifted linearly in the up-and-down direction, as seen in FIG. 2, relative to each other by one-half of the pitch distance between the nozzles in a row. Accordingly, the centerlines of the nozzles 4 lie at the middle distance between the centerlines of the nozzles 7, of course with the exception of the uppermost nozzle 4. Thus, when the heads move in unison in the direction indicated by the arrow A, it is possible to produce a row of separated dots by means of the nozzles 7 and then connect those dots by intermediate dots produced by the row of nozzles 4. The result is a row of continuously connected dots. In the known manner, letters can be printed composed entirely of dots as the combination of heads moves in the direction indicated by the arrow A and nozzles are selectively brought into play to produce dots.

With such an embodiment as illustrated in FIG. 2, there is no difficulty in producing high-quality print characters, and the cross-sectional area for the head can be made small, since the number of pressure chambers and nozzles in each head is reduced in inverse proportion to the number of heads which are combined to produce a continuous row of dots. However, the distance laterally between the left nozzles 4 and the right nozzles 7 is determined by the thickness of the vibration plates 5, 5′ and the thickness of the piezoelectric elements 6, 6′. As a practical matter, as with the prior art shown in FIG. 1, the condition arises during printing where while one character is being printed by one row, the other row, if it is to be efficiently used, is already printing another character. Accordingly, this embodiment requires a complex control system capable of printing two characters simultaneously. Furthermore, a delicate adjustment is required in establishing the physical relationship between the heads and more particularly the nozzles 4, 7 on the opposed heads so as to exactly shift the vertical position of one linear row of nozzle relative to the other linear row of nozzles by one-half the pitch distance between the centerlines of the nozzles in a row. This additional requirement for precision assembly raises the cost of the printer head and is a disadvantage of this type of printing apparatus.

The print head in accordance with this invention eliminates the various deficiencies described above and provides an inexpensive and small-sized head for a printer which produces print characters of high density.

With reference to FIGS. 3–6, the print head 8 of this invention includes an intermediate plate 11 having pressure chambers 12, 16 formed in both side planar surfaces by chemical etching. The pressure chambers 12, 16 have a depth of approximately 50 microns. The construction on both side surfaces of the intermediate plate 11 is substantially similar, and the description which follows relates to the left side as seen in FIGS. 3 and 4 but is equally applicable to the right side with the exceptions as described more fully hereinafter. The nozzles 13 of the left side of the intermediate plate 11 connect to the pressure chambers 12 through elongated, tapering ducts 26, and the pressure chambers 12 connect at their other ends to the feed reservoir 14. As best seen in FIG. 4, the ducts 26 are arrayed in a fanlike pattern, and the pressure chambers 12 are distributed along an arc such that the length of every duct and the path for delivery of ink to the nozzles are substantially the same, and ink is discharged uniformly from every nozzle. Ink is discharged in the outward direction perpendicular to the plane of the paper of FIG. 3. A passage 15 connects the feed reservoir 14 to a supply of ink (not shown) through a duct member 25. The same pattern of pressure chambers, ducts and reservoir is formed on the opposite surface of the intermediate plate 11 and provides ink to the right side (FIG. 3) row of nozzles 17. However, as best seen in FIG. 5, pressure chambers 16 on the right side of the intermediate plate 11 are angularly offset along substantially the same arc from the pressure chambers 12 on the left side of intermediate plate 11. The jet nozzles 17 on the right side of intermediate plate 11 are displaced in the direction of the linear row of nozzles by half of the pitch distance d from the nozzles 13 on the left side of intermediate plate 11. Otherwise, the spacing d between the nozzles in the linear direction of the nozzle row is the same for both rows.

The pressure chambers 12, 16 are substantially circular in side view (FIGS. 4 and 5), with the center of the chambers on one side of the intermediate plate 11 being located substantially at the midpoint of the arc between pressure chambers on the other side of the intermediate plate 11. Accordingly, the circular base of a recessed pressure chamber 16 is reinforced from the opposite side by an unrecessed neck portion 30 formed between pressure chambers 12. The pressure chambers 12 are similarly reinforced by the neck portions (not shown) of the opposite surface.

An outer plate 21 is attached to the left planar surface 28 of the intermediate plate 11, and an outer plate 22 is similarly attached to the right planar surface 29 of the intermediate plate 11. Thus, except for the inlet passage 15 and the nozzle discharge openings 13, 17, the chambers 12, 16 and ducts 26, 27 are closed. Ink provided at the supply duct member 25 fills the feed reservoirs 14 on both sides of the intermediate plate 11 through the passages 15 and fills the pressure chambers 12, 16 and the tapering connecting ducts 26, 27 by capillary action.

Piezoelectric elements 23 are attached to the outer planar surface 31 of the outer deflection plate 21, and piezoelectric elements 24 are attached to the outer planar surface 32 of the opposite outer deflection plate 22. The piezoelectric elements 23, 24 are circular in cross section (FIG. 6) and are positioned on the outer surfaces 31, 32 of the plates 21, 22 along an arc and in registry with the pressure chambers 12, 16, respectively, in the intermediate plate 11. When electrically driven by means not shown, in the conventional manner, a piezoelectric element causes a local deflection in its mounting plate, that is, driving a piezoelectric element 23 causes a local deflection in the outer plate 21. This deflection reduces the internal volume of the pressure chamber 12, positioned in registry with that particular driven piezoelectric element 23, and forces a jet of ink drops from the connected nozzle 13. The force of the driven piezoelectric element is not transmitted from the associated pressure chamber 12 to a pressure chamber 16 on the opposite surface of the intermediate plate 11 because of the offset arrangement of the pressure chambers 12, 16 on both sides of the intermediate plate 11, which places the reinforcing neck portions 30 into position to resist deformation which might otherwise be induced by the increased pressure on the opposite side of the plate 11.

The illustrated embodiment, merely as an example, shows a print head having twenty-four jet nozzles 13, 17 arrayed twelve on each side of the intermediate plate 11. As stated above, the nozzles 13, 17 are spaced apart linearly in the same row by a pitch distance d and laterally from one planar surface 28 to the other planar surface 29 by a center distance c. The lateral spacing c is determined principally by the thickness of the intermediate plate 11, which is governed by the need for rigidity in that plate 11 and the depth of etching used in forming the pressure chambers and nozzle ducts.

Any nozzle on either side of the intermediate plate 11 can be actuated individually by electrically driving the associated piezoelectric element. All nozzles can be actuated simultaneously, in which case, two rows of dots will be printed having a centerline distance substantially equal to the spacing c and having dots separated in the vertical or linear direction approximately by a distance d. Further, any combination of nozzles may be actuated at one time or no nozzles need be activated as the print head 8 moves relative to the medium to be printed upon in the direction indicated by the arrow B. A continuous line of twenty-four dots produced by the ink jet nozzles results when first the twelve nozzles 13 are actuated simultaneously; the head is then moved by a distance c in the direction of arrows B, and the twelve jet nozzles 17 are actuated.

FIG. 7 illustrates, to an enlarged scale, printed characters as might be formed by the print head 8 according to this invention. The illustrated character is the letter E, and it is comprised of aligned dots in contiguous relationship one to the other, with clear spaces 38 between them. The vertical dimension f of the character E is twenty-four dots, indicating that every nozzle 13, 17 on the print head 8 is utilized in forming the character. In printing the characters, the head 8 moves in the direction indicated by the arrow B, as stated above. The first character 34 is completed, whereas the second character 35 is only a partially completed E. Notice that in the partially completed character 35, the leading dots 36 are printed by the nozzles on the leading side, in the direction of motion of the intermediate plate 11, while simultaneously the dots 37 are being printed by the trailing nozzles on the intermediate plate 11. The centerline distance between the leading and trailing dots 36, 37 is the lateral spacing of the nozzles c. It is also seen that in this example of an embodiment according to this invention, three dots fit between the leading dots 36 and the trailing edge dots 37.

The distance e between the characters 34, 35 is greater than the lateral distance c between the nozzles 13, 17. Accordingly, in printing characters as illustrated in FIG. 7, the print head of this invention is never required to print two characters simultaneously, and the complexity of a control system is no different than in a design where each dot is printed from a single vertical row of nozzles. The control system is conventional, and the use of two rows of nozzles is accommodated merely by means of a shift register or delay elements in the circuitry used to effect control. The control circuits are not a novel part of this invention, and accordingly, are not described in detail herein.

After ink has been ejected from a nozzle by the sudden change in volume in the associated pressure chamber due to driving of the piezoelectric element, the pressure chamber refills with ink when the deflection ceases and under the influence of capillary action. The printing head according to this invention provides for production of characters having a high density as a result of the contiguous pattern of dots. The head can be made smaller than the prior art designs by using conventional manufacturing techniques because the pressure chambers are distributed on two sides of the intermediate plate 11. Moreover, as described above, the patterns of pressure chambers 12, 16 are disposed on both sides of the intermediate plate 11, and it is unnecessary to adjust the relative vertical positions of the left nozzles 13 and the right nozzles 17 (FIG. 3). Also, an increased complexity of the control circuits is avoided by making the thickness of the intermediate plate 11 and the lateral spacing c of the nozzles 13, 17 less than the space e between two printed, adjacent characters. Further, interaction between opposed pressure chambers 12, 16 when a piezoelectric element is driven is prevented by the offset positioning of the left and right side pressure chambers so as to provide reinforcement of the plate material between them by means of the neck portions 30.

An alternative embodiment of an ink jet printer head in accordance with this invention is shown in FIG. 8, wherein elements common to the previous embodiment have the same reference numeral. In FIG. 8, pressure chambers 12 are formed on one side of an intermediate plate 11 by chemical etching giving the chambers 12 a depth in a range of approximately 20 to several hundred microns. Nozzles 13 are connected to the pressure chambers 12 through respective feed channels 15' which also connect to an inlet feed reservoir or chamber 14. Thus, a complete flow path from the chamber 14 through the channels or passages 15' and pressure chambers 12 lead to the nozzles 13 from which ink is discharged.

Figure 9:
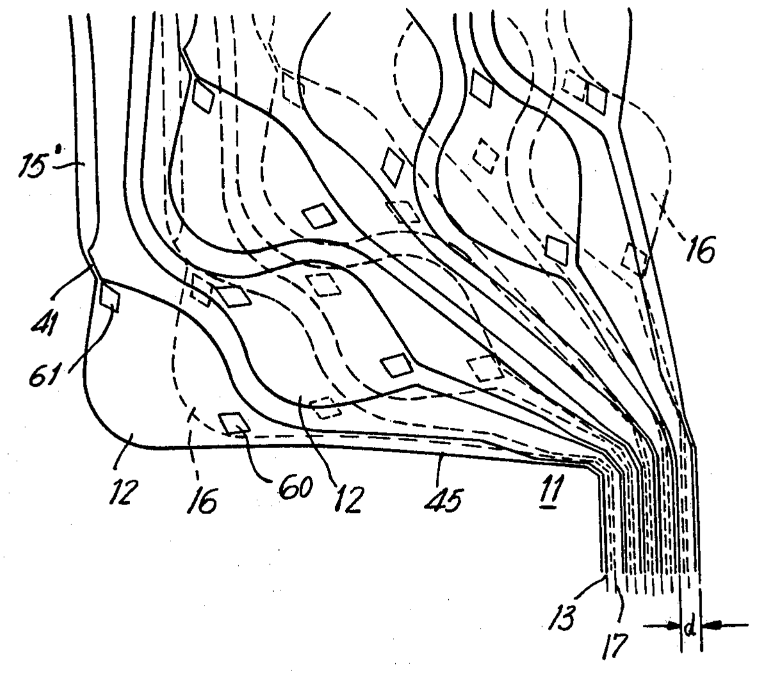
FIG. 9 is an enlarged portion of FIG. 8.

On the reverse surface of the intermediate plate 11, the second pattern of channels, chambers and nozzles is formed. However, as shown in FIG. 9, pressure chambers 12 formed on one side of the intermediate plate 11 are shifted relative to the pressure chambers 16 formed on the other side of the intermediate plate 11. Thus, pressure chambers 12, 16 are not directly back to back and similarly the nozzles 13 are shifted by half of the pitch distance d from the nozzles 17 on the opposite side of the intermediate plate 11.

The front view of the assembled print head of FIG. 8 is the same as that shown in FIG. 3 and the operation and performance of this head are as described above for the embodiment of FIGS. 3, 4. After ink has been ejected from the nozzles 13, 17, ink flows into the chambers 12, 16 from the inlet feed reservoir 14 which feeds both sides of the intermediate plate 11. The ink is drawn to the pressure chambers 12, 16 by capillary action.

The quantity and the velocity of ink which is ejected from the nozzles are varied by changes in the shape of the cross-sectional area and length of the pressure chambers 12, 16 and feed channel 15 in correspondence with the associated nozzle. In order to obtain printing of high quality, it is necessary to eject ink with the conditions of uniform velocity and phase relationship and delivered volume from each nozzle when a uniform voltage-current wave form is provided to the piezoelectric elements. These objectives can be accomplished when the length of the feed channels 15' coupling the pressure chambers 12, 16 to the inlet feed chamber 14, as in FIG. 8, is maintained uniform or when a high impedance portion 41 is provided as part of the feed channel 15' (FIG. 9) so that each inlet path is the same for each chamber 12, 16. Also, it may be possible for uniform impedance to make distance identical between each nozzle 13 and its associated pressure chamber 12. But to do this, it is difficult to obtain a high density of channels and size is increased. But, as shown in FIG. 8, when the pressure chambers are staggered in relationship to each other on the same face of the intermediate plate 11, a high density can be realized. In FIG. 8, the length of the feed channels 15' have been made uniform so as to provide uniform impedances. However, it is also possible to make the impedances to flow substantially identical for each nozzle by adjusting the width or depth of the feed channel 15'.

Figure 13:
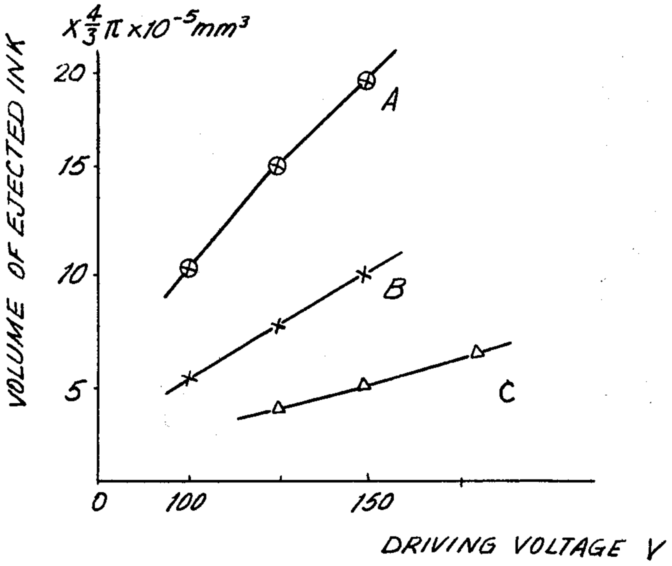
FIG. 13 is a graph showing the effect of various parameters on the volume of ink ejected from a printer head nozzle in accordance with this invention.

FIG. 13 shows the relationship between driving voltage V and the ejected volume of ink when the distance between a pressure chamber 12 and a nozzle 13 is a constant and the input length of the feed channel 15' is varied. In the curve A, the length of the feed channel 15' is 8 millimeters, and for curve B, the length of the feed channel 15' is 2 millimeters. Generally speaking, the greater the impedance of the feed channel 15', the larger is the quantity of ink ejected by the nozzle 13. In other words, the higher impedance of the channel 15' reduces the amount of backflow from the pressure chamber 12 when the piezoelectric element is activated to eject ink from the nozzle 13. After the ink is ejected, the quantity of air drawn into the nozzle 13 is displaced outwardly by the surface tension of ink which again fills the nozzle 13. However, the pressures which are acting on the ink are greatly different at the time of ejection as compared to the time when the ink returns to what may be called a standby-condition after ejection. The volume and velocity of flow are different and the effects of viscosity and inertia on the total impedance of the ink flow paths are different. The quantity of ink to be ejected and the time for restoration of the equilibrium within the nozzle and the channels after ejection is made a constant factor by varying the width, length, and shape of the flow channels.

Ink is more easily ejected when the pressure chamber 12 is smoothly connected to the nozzle 13, and the impedance to flow is low. Therefore, it is desirable to enlarge the width of the feed channel as compared to the nozzle. Further, because the piezoelectric elements 23, 24 are round, the pressure chambers 12, 16 are made to the maximum degree possible substantially round. For this purpose, a first island 60 and a second island 61 are disposed at the outlet and inlet respectively of the pressure chamber as shown in FIG. 11. Unless the pressure chamber 12 is close to being round, a vibration of high frequency is generated and the pressure within the pressure chamber 12 does not increase uniformly when the piezoelectric element is energized. As a result, the ejected ink separates into a number of particles rather than a cohesive droplet and as a result, printing quality diminishes. Because the first and second islands 60,61 prevent an overtone vibrational frequency from being generated, it is possible to eject ink uniformly even when the plan shape of the pressure chamber 12 varies somewhat from a true circular shape.

In an embodiment (FIG. 11) where the width of the feed channel 15′ is large, an island 62 within the feed channel 15′ restrains pressure vibrations of high frequency and controls flow impedance of the channel.

In a head for an ink-on-demand type ink jet printer in accordance with this invention, it is an absolute requisite for transmitting the pressure used in ejecting ink that substantially no bubbles collect within the channels. When no bubbles are present, good quality printing is obtained. However, there is a considerable probability for a bubble to appear for various reasons. For example, air dissolved in the ink fluid may coalesce to be a bubble; a bubble may flow in from an ink supply tank; and air may be absorbed through the nozzle opening. If a bubble should occur, the simplest solution to the problem would be to have the bubble flow out of the nozzles with the ink. However, when ink flows out through the nozzle 13 by applying pressure from the inlet feed reservoir 14, only the air proximate the center of the pressure chamber 12 is pushed out and the air at the circumferential periphery of the pressure chamber 12 remains. This occurs because the width of the pressure chamber 12 is substantially greater than the width of the other flow channels. However, in accordance with this invention, the second island 61 at the inlet to the pressure chamber 12 uniformly distributes the velocity of flow through the chamber 12 and the bubbles are easily carried to the nozzle 13 for ejection regardless of their original position within the pressure chamber 12.

When the depth of the channels are constant over their entire length as produced, for example, by etching, the volume of flow for a given driving voltage is diminished as indicated by the curve C of FIG. 13. Also, the period of time required to restore the ink conditions in the nozzles becomes extremely long after ink has been ejected when the supply channels are of the same dimensions as the nozzles. To avoid this disadvantage, the actual nozzle 13, where the ink is ejected from the intermediate plate 11, is substantially less than the depth $D_1$ of the channel 45 between the pressure chamber 12 and the nozzle 13. With such a configuration (FIG. 14) ejection efficiency and frequency response is enhanced. The depth $D_2$ of a nozzle 13 is in the range of 40 to 50 microns; the length is in the order of 50 to 300 microns and the depth of the connecting channel 45 is in the range of 70 to 150 microns so as to obtain a 2 KHZ response frequency.

The selected length of the nozzle 13 has a close relationship to the quantity of air drawn into the nozzle at the time when the volume of the pressure chamber 12 is restored by de-energization of the piezoelectric element 23. The quantity of air drawn into the nozzle 13 immediately after the ink is ejected is proportionate to the quantity of ejected ink. It is necessary that the nozzle portion 13 be of sufficient length such that the boundary between the air and the ink in the nozzle 13, where surface tension is active is prevented from entering into the deep channel 45. Because a small quantity of ink still adheres on the side walls of the nozzle 13, if the air/ink boundary enters the enlarged channel 45, then, a change in the pressure balance, even a slight change, can cause the ink remaining on one side wall of the nozzle 13 to contact with the ink on the opposite side wall in the vicinity of the nozzle. Thus, a boundary comes into being between the air and the nozzle and the bubble remains within the channel 45. As stated above, a proper length of the nozzle 13 prevents the air drawn into the nozzle 13 when the ink is ejected from entering into the channel 45 and forming an entrapped bubble therein.

The thickness of the intermediate plate 11 is very important since it determines in some measure whether the ink jet print head will be active simultaneously in printing more than one character at a time. For the sake of simplicity in the controls, it is desirable that the nozzles 13, 17 on both sides of the intermediate plate 11 be close together as described above. When the total thickness of the vibration plate 21, for providing a pressure pulse to the pressure chamber 12, and the piezoelectric element 23 is equal to the remaining thickness of the intermediate plate 11 after the intermediate plate 11 has been made thin by etching, or the like, the pressure in the chamber increases only by half of that which would be produced if the intermediate plate 11 were rigid. Further, if another pressure chamber is positioned on the other side of the intermediate plate 11 in substantial registry with the pressure chamber on the first side of the intermediate plate 11, pressure generated by energization of the piezoelectric element on one side will be transmitted to the opposite side and in equal level. As a consequence, the pressure chamber volume, the velocity of ejected ink, etc., vary depending upon whether opposed pressure chambers on both sides are driven simultaneously, or only one pressure chamber is driven. As a result of these differing responses, printing quality is diminished.

Therefore, it is necessary to prevent the pressure in one chamber from influencing the pressure in a chamber 12 on the opposite side of the intermediate plate 12. Or, it is necessary to make the influence from one side to the other side of the intermediate plate 11 so small that it can be disregarded. The magnitude of the pressure carry-over effect from one side to the other side depends substantially inversely on the square of the thickness of the intermediate plate. In order to control the carry-over of pressure from one side of the intermediate plate 11 to the other side when the opposed pressure chambers are in registry, the intermediate plate thickness after etching should be approximately 3.2 times the combined thickness of the vibration plate and the piezoelectric element. Then, approximately ten percent of the pressure value is produced in the opposed chamber. Thus, when the thickness of the vibration plate 21, and that of the piezoelectric element 23 are each 0.15 millimeters, the remaining thickness after etching of the intermediate plate 11 should be in the order of 0.95 millimeters. However, in accordance with this invention, where the pressure chambers on opposite sides of the intermediate plate 11 are not in registry but rather are shifted as shown in FIG. 9, the thickness of the intermediate plate after etching is decreased, taking into consideration the opposite vibration place, piezoelectric element and thickness of the intermediate plate where it is not etched, all of which tend to stiffen the printer head. Thus, for example, where the depth of etching to form the pressure chamber is 70 microns, the thickness of the intermediate plate after etching is defined as follows:

$$0.95-(0.15+0.15+0.07)=0.58 \text{ millimeters}$$

Thus, the remaining thickness of the intermediate plate 11 can be reduced from 0.95 to 0.58 millimeters and still the carry-over of pressure from one side to the other is less than 0.6 percent. The change in volume of the pressure chamber due to flexure of a circular plate is approximately in proportion to the fourth power of the diameter of the circle. Thus, by positioning the pressure chambers 12, 16 on opposite sides of the intermediate plate 11 so that they are not in registry, the influence of pressure from one side to the other can be substantially disregarded. Further, because of thickness of the intermediate plate 11 is low, that is, the intermediate plate is thin, the distance C between one row of nozzles on one side of the plate and the other row of nozzles is less than space e between one printed character and another printed character when the printing is completed as shown in FIGS. 3 and 7.

The procedures for making a highly integrated printer head of FIG. 3 are now described in sequence. First, chromium and gold are deposited on a material which is not easily penetrated by ink, for example, borosilicate glass which is dimensioned so as to be suitable for the intermediate plate 11. A resist coating is applied to the planar surfaces and both sides are exposed to light by using a photo mask which forms the patterns shown in FIG. 8. This is, as stated above, the beginnings of the intermediate plate 11. Then, the material is etched. For example, the glass is etched by hydrofluoric acid and grooves are formed for flow channels. The gold and chromium are stripped off, and a spacer 48 having substantially the same thickness as that of the transparent intermediate plate 11 is positioned away from the intermediate plate 11 with a gap sufficient to provide for the preliminary feed chamber 14 (FIG. 8). Then, on both major planar surfaces of the intermediate plate 11, vibration plates 21, 22 are positioned, being held in this position by a jig. The entire assembly is put into a hearth at 550° C. to 700° C. As a result, the intermediate plate 21, spacer 48 and vibration plates 21, 22 are welded together as an integral component. When a nesa film, for example, $In_3O_3$, is formed on the outside of the vibration plates 21,22 it serves as a transparent electrode which is used in association with the piezoelectric elements 23, 24. The electrode film is formed either before or after the fusion bonding described. Further, it is possible to deposit gold, chromium, etc., in only those portions required to served as electrodes to the piezoelectric elements by using a deposition pattern or etching. As a result, the channels can be seen through the transparent elements. Of course, if there is no need to see the inner configuration of the printer head, it is not necessary to use transparent components.

Figure 16C:
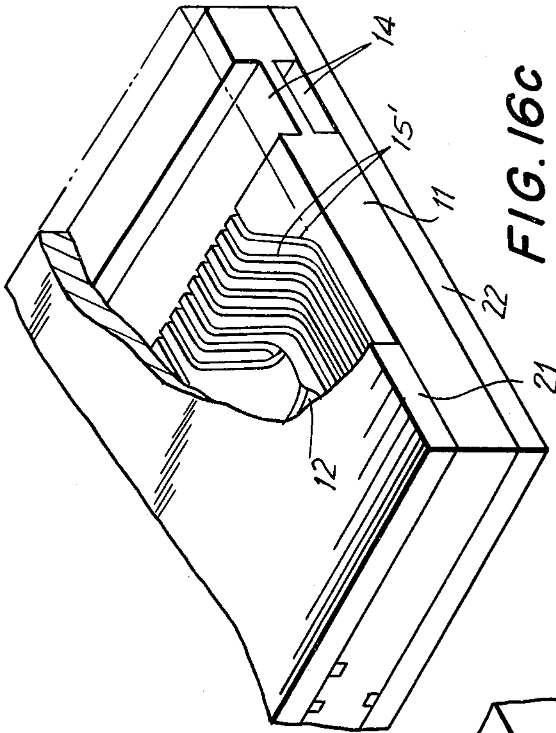
FIGS. 16*a*, *b*, *c*, are partial, enlarged, perspective views with portions cut away showing details of the embodiments of FIGS. 8, 10 and 11 respectively.
Figure 16A:
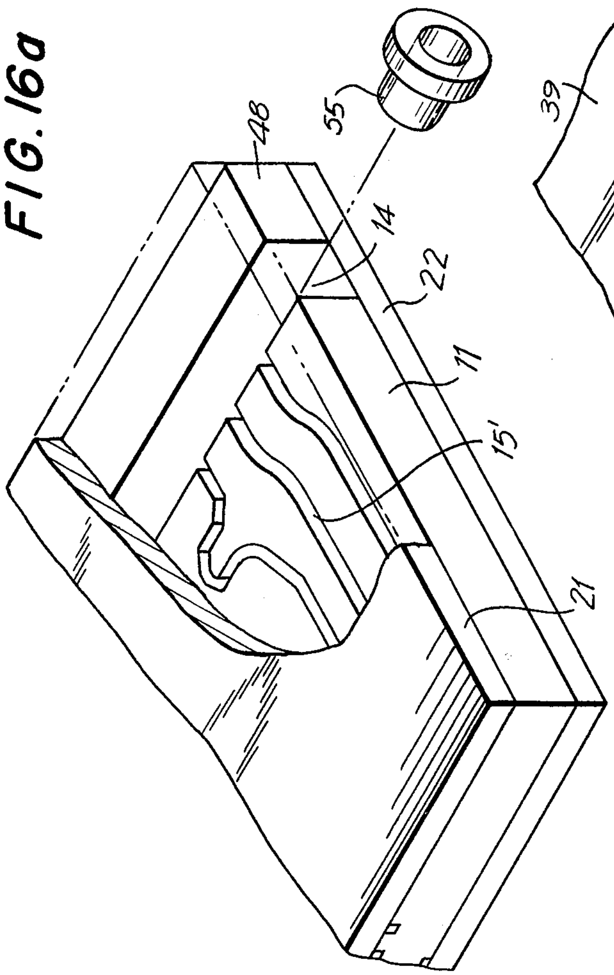
Figure 16B:
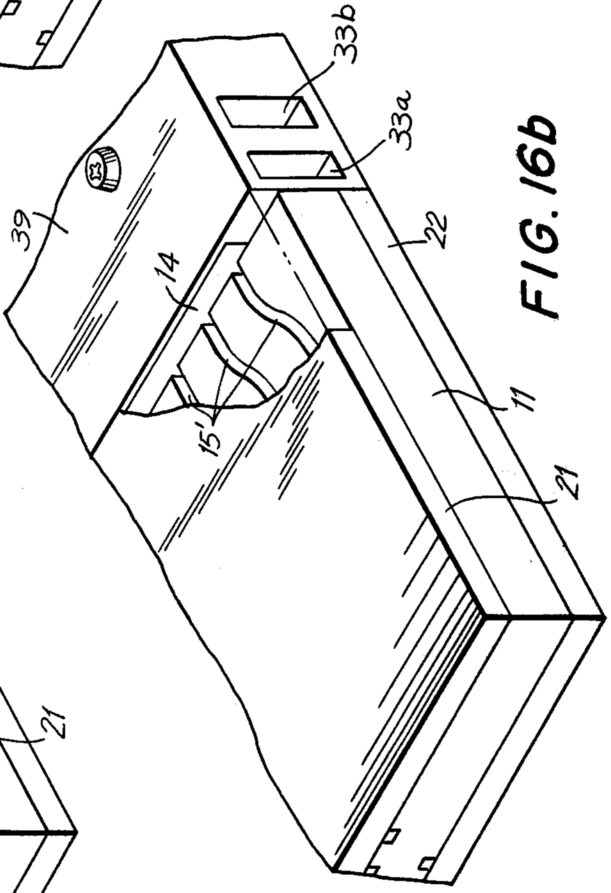

The preliminary feed chambers or reservoirs 14 as shown in FIGS. 8, 10 and 11 for the different embodiments in accordance with this invention, are described in more detail with reference to FIGS. 16*a, b, c.* FIG. 16*a* shows an embodiment wherein the intermediate plate 11 and the spacer 48 of FIG. 8 are placed between the two outer deflection plates 21, 22 to form an internal volume which serves as the preliminary feed chamber 14. FIG. 16*b* is an embodiment where an ink reservoir 39 (FIG. 10) is a separate component, for example, fabricated of a plastic material. In this ink reservoir 39, are formed an inlet feed chamber 14, a port 33*a* for the entrance of ink and an exit 33*b*. Th ink reservoir 39 abuts with the intermediate plate 11 and deflection plates 21, 22 so that ink from the reservoir 39, and more particularly from the feed reservoir 14 is accessible to the channels 15'.

FIG. 16*c* shows a structure wherein preliminary feed chambers 14 are formed in the intermediate plate 11 by etching along with the pressure chambers 12 and channels 15' (FIG. 11).

When using a spacer 48 as shown in FIG. 16*a*, a feed pipe 55 of stainless steel (FIG. 8) is used at each end 33*a*, 33*b* of the feed chamber 14. The feed pipe 55 is held in position by a binder 54. The ink exit 33*b* is not a necessity for the purposes of printing. However, when a gas bubble undesirably enters the ink system from the ink tank (not shown), and ink is circulated through the ink system including the preliminary feed chamber 14, the bubble can be removed and stable printing can be achieved without the necessity of pushing the bubble out through the pressure chambers 12, 16 or the nozzles 13, 17.

Figure 14:
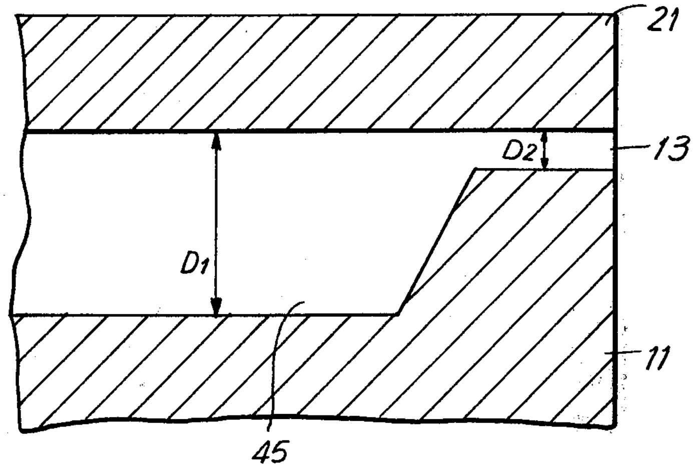
FIG. 14 is a fragmentary sectional view of a nozzle and feed channel to an enlarged scale.

A nozzle as shown in FIG. 14 is produce by a double etching process. After fusion bonding is completed, a template 40 is tacked to the plate 11 using tabs 42 (FIG. 12) and registering the recessed crosses 47 with the crosses 46 (FIG. 8) and the template 40 is used for locating the piezoelectric elements (FIG. 12). The template 40 includes 12 holes 51. Some are larger in diameter than the piezoelectric elements 23, 24. The template thickness is approximately the same as the thickness of the piezoelectric elements. When the template 40 for determining the location of the piezoelectric elements is fabricated of metal, the template can also be used as an solder electrode. The piezoelectric element is positioned in the hole 51 and is attached by means of epoxy bonding, metal solder, such as Au-Sn solder, or by other suitable methods. Then, each piezoelectric element is wired by attachment of wires to the electrodes. The wired portions are sealed by a soft material such as silicone resin to provide an electrical insulation. A further coat is applied in order to increase resistance to the environment and good results are achieved. The pizoelectric element is wired by any of various methods, such as solder, dielectric bonding material, wire bonding, or by using a dielectric gum, metal, etc. Thus, a highly integrated printer head is fabricated. Further, the nozzles are cut by a diamond cutter or polished to make the surface smooth. Thus, is the condition of the nozzles surfaces improved and the shape of the nozzles becomes uniform.

The wall between one channel 15' and another channel 15' requires at least 50 microns in thicknesss because it is necessary for the wall to have sufficient strength so as not to be broken, for example, when a material such as ink freezes within it. In structures in accordance with this invention, it has been found that the wall does not break even when ink is frozen at a temperature of −40° when the depth of channel etching is 100 microns. Etching produces V-shaped channels and nozzles.

Although borosilicate glass is principally used for the head member in the embodiments described above, the printer head can also be produced in plastic. Also, instead of being etched, borosilicate glass can be formed with channels, etc. at high temperature. A plurality of the highly integrated heads described above in accordance with this invention are combined to make a single highly integrated head capable of high density printing and high speed printing.

Figure 15:
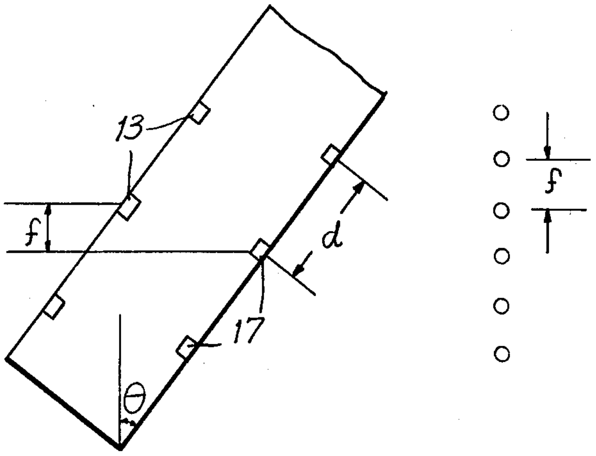
FIG. 15 is a partial front view, similar to FIG. 3 of an ink jet head in accordance with this invention.

When the head in accordance with this invention is positioned at an angle $\theta$ as shown in FIG. 15, the distance f between a printed dot and another printed dot is less than the distance d between one nozzle and another nozzle 13, 17.

$$f = d \sin \theta/2 \leqq d/2$$

As a result, printing of yet higher density is achieved.

In accordance with this invention, a head for an ink jet printer which has a printing quality similar to a typwriter using solid type is readily provided. The printer head in accordance with this invention can be used not only in printers but also for a copying press or a facsimile machine and the like.

It should be understood that in an alternative embodiment of this invention, the planar surfaces of the intermediate plate need not be parallel, and whatever advantage is inherent in the tilted-nozzle embodiment of FIG. 1 can be combined with the advantages of incorporating nozzles on both sides of the plate.

It will thus be seen that the objects set forth above, and those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printing head for an ink-on-demand ink jet printer comprising:

an intermediate plate, said intermediate plate having formed in opposed surfaces thereof a plurality of individual pressure chambers for holding ink and a duct associated with each said pressure chamber, said ducts leading to an edge of said intermediate plate;

a pair of vibration plates attached to said intermediate plate with one vibration plate on each of said opposed surfaces of said intermediate plate, a common surface on each said vibration plate spanning all of said plurality of pressure chambers on the associated surface of each intermediate plate;

a plurality of electromechanical transducing means attached to said vibration plates for deflecting said vibration plates locally when said transducing means are driven, each one of said plurality of transducing means being in registry with an individual one of said pressure chambers; and means for feeding ink to said pressure chambers including an inlet feed reservoir for providing ink to said pressure chambers, said reservoir comprising a spacer position between said vibration plates, said vibration plates extending beyond said intermediate plate, said spacer being spaced away from said intermediate plate whereby said reservoir is formed between said spacer, said intermediate plate and said vibration plates, said combination of plates forming substantially closed pressure chambers and ducts leading to nozzles at said edge, and driving and transducing means reducing the capacity of said registered chamber, causing at least a portion of the ink contents of said registered chamber to be expelled through said associated nozzle.

2. A printing head as claimed in claim 1, wherein said means for feeding ink to said pressure chambers comprise grooves in said intermediate plate, said grooves being of different lengths, said grooves having an island therein, the length and width of said island determining the impedance to flow of fluid from said associated nozzles, whereby every nozzle can be made to eject the same quantity of ink when driven.

3. A printing head as claimed in claim 1, wherein said dimensions adapted to provide uniform flow include the length, width and shapes and contours of said flow channels.

4. A printing head for an ink-on-demand ink jet type printer comprising:

an intermediate plate, said intermediate plate having formed in opposed surfaces thereof a plurality of individual pressure chambers for holding ink and a duct associated with each said pressure chamber, said ducts leading to an edge of said intermediate plate, said pressure chambers being at different distances from said edge, each said duct being adapted to provide the same flow impedance to ink between said pressure chambers and said edge;

a pair of outer plates attached to said intermediate plate with one outer plate on each of said opposed surfaces of said intermediate plate, a common surface on each said outer plate spanning all of said plurality of pressure chambers on the associated surface of each intermediate plate;

a plurality of electromechanical transducing means attached to said outer plates for deflecting said outer plates locally when said transducing means are driven, each one of said plurality of transducing means being in registry with an individual one of said pressure chambers; and a plurality of supply channels for feeding ink to said pressure chambers individually, said supply channels being formed in said opposed surfaces of said intermediate plate, each said supply channel having a high impedance portion, the flow impedance in said channel entering each said associated pressure chamber differing from the flow impedance in said duct exiting from said associated pressure chamber and leading to said edge, the impedance of each said duct being less than the impedance of said supply channel to said associated pressure chamber;

said combination of plates forming substantially closed pressure chambers and ducts leading to nozzles at said edge, and driving a transducing means reduces the capacity of said registered chamber, causing at least a portion of the ink contents of said registered chamber to be expelled through said associated nozzle, the quantity of ink from each said nozzle being equal.

* * * * *